United States Patent
Shimojou et al.

(10) Patent No.: US 10,652,813 B2
(45) Date of Patent: May 12, 2020

(54) SLICE MANAGEMENT SYSTEM AND SLICE MANAGEMENT METHOD

(71) Applicant: NTT DOCOMO, INC., Chiyoda-ku (JP)

(72) Inventors: Takuya Shimojou, Chiyoda-ku (JP); Tomoki Shibahara, Chiyoda-ku (JP); Atsushi Minokuchi, Chiyoda-ku (JP); Masayoshi Shimizu, Chiyoda-ku (JP); Ashiq Khan, Chiyoda-ku (JP); Kazuaki Obana, Chiyoda-ku (JP); Srisakul Thakolsri, Munich (DE); Malla Reddy Sama, Munich (DE); Wolfgang Kiess, Munich (DE); Joan Triay Marques, Munich (DE)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/077,826

(22) PCT Filed: Mar. 29, 2017

(86) PCT No.: PCT/JP2017/012889
§ 371 (c)(1),
(2) Date: Aug. 14, 2018

(87) PCT Pub. No.: WO2017/170690
PCT Pub. Date: Oct. 5, 2017

(65) Prior Publication Data
US 2019/0053146 A1    Feb. 14, 2019

(30) Foreign Application Priority Data
Apr. 1, 2016    (JP) .................................. 2016-074608

(51) Int. Cl.
*H04W 48/18*    (2009.01)
*H04W 48/16*    (2009.01)
(Continued)

(52) U.S. Cl.
CPC .............. *H04W 48/18* (2013.01); *G06F 9/50* (2013.01); *G06F 9/5077* (2013.01);
(Continued)

(58) Field of Classification Search
None
See application file for complete search history.

(56) References Cited

U.S. PATENT DOCUMENTS 7,433,317 B2 * 10/2008 Kobayashi .......... H04L 12/4641
                                                          370/241
7,782,870 B1 *  8/2010 Tripathi ................ H04L 47/521
                                                          370/395.42

(Continued)

FOREIGN PATENT DOCUMENTS

| JP | 2014-45390 A | 3/2014 |
| WO | WO 2011/032595 A1 | 3/2011 |

OTHER PUBLICATIONS

International Search Report dated Jun. 20, 2017 in PCT/JP2017/012889 filed Mar. 29, 2017.
(Continued)

*Primary Examiner* — Bunjob Jaroenchonwanit
(74) *Attorney, Agent, or Firm* — Oblon, McClelland, Maier & Neustadt, L.L.P.

(57) ABSTRACT

A slice management system (1) is a slice management system managing slices that are virtual networks generated on a network infrastructure, comprises a memory storing a priority list in which slices of connection destination candidates of a UE (2) are aligned in order of priority levels and, in a case in which a connection request for a slice from the
(Continued)

UE (2) is acquired, determines a slice to which UE (2) is to be connected on the basis of the priority list stored in the memory.

8 Claims, 17 Drawing Sheets

(51) Int. Cl.
  *G06F 9/50* (2006.01)
  *H04M 11/00* (2006.01)
  *H04L 29/12* (2006.01)
  *H04W 16/02* (2009.01)
  *H04L 12/46* (2006.01)

(52) U.S. Cl.
  CPC ......... *H04L 61/1511* (2013.01); *H04M 11/00* (2013.01); *H04W 16/02* (2013.01); *H04W 48/16* (2013.01); *H04L 12/4641* (2013.01)

(56) References Cited

U.S. PATENT DOCUMENTS

| | | | | |
|---|---|---|---|---|
| 8,902,904 B2* | 12/2014 | Gast | .................... | H04L 12/4679 370/329 |
| 9,590,900 B2* | 3/2017 | Rajah | .................... | H04L 45/586 |
| 2004/0054902 A1* | 3/2004 | Fujimoto | ............ | H04L 12/4633 713/168 |
| 2004/0153674 A1* | 8/2004 | Hayashi | ................ | H04L 9/0836 380/217 |
| 2008/0095120 A1* | 4/2008 | Hong | .................... | H04W 36/24 370/332 |
| 2009/0067436 A1* | 3/2009 | Gast | .................... | H04L 12/4679 370/395.53 |
| 2009/0270105 A1* | 10/2009 | Kakumaru | ............ | H04W 36/36 455/436 |
| 2010/0260143 A1* | 10/2010 | Tanabe | .............. | H04W 36/0022 370/331 |
| 2018/0262947 A1* | 9/2018 | Raleigh | ............... | H04L 41/0893 |

OTHER PUBLICATIONS

Nakao, A., "Virtual Node Project Virtualization Technology for Building New-Generation," National Institute of Information and Communication Technology, Jun. 2010, 12 pages, retrieved from: http://www.nict.go.jp/publication/NICT-News/1006/01.html.

China Mobile, "Solutions for Key Issue 1 (Support of Network Slicing)," Online, 3GPP TSG-SA WG#2113AH S2-161081, Feb. 26, 2016, 5 pages, retrieved from: http://www.3gpp.org/ftp/tsg_sa_WG2_Arch/TSGS2_113AH_Sophia_Antipolis/Docs/S2-161081.zip.

NTT Docomo, "Solution to support a UE with simultaneous connections to multiple Network Slices [online]," 3GPP TSG-SA WG2#113AH S2-161043, Feb. 26, 2016, 4 pages, retrieved from: http://www.3gpp.org/ftp/tsg_sa_WG2_Arch/TSGS2_113AH_Sophia_Antipolis/Docs/S2-161043.zip.

Shimojyo, T. et al., "Future Mobile Core Network for Efficient Service Operation," Network Softwarization 2015 1st IEEE Conference, Apr. 2015, 7 pages.

International Preliminary Report on Patentability dated Oct. 4, 2018 in PCT/JP2017/012889 (submitting English translation only).

Extended European Search Report in Application No. 17775224.3.

* cited by examiner

UE Usage Type=car, Service Type=eMBB

| location | Cell ID | slice ID | IP address |
|---|---|---|---|
| DC#1 | #1~10 | eMBB | aa.aa.aa.aa |
| DC#2 | #11~20 | eMBB | bb.bb.bb.bb |
| DC#3 | #21~30 | eMBB | cc.cc.cc.cc |

(b)

UE Usage Type=car, Service Type=intra car communication

| location | Cell ID | slice ID | IP address |
|---|---|---|---|
| DC#1 | #1~10 | car | xx.xx.xx.xx |
| DC#2 | #11~20 | car | yy.yy.yy.yy |
| DC#3 | #21~30 | | |

| slice ID | CONSTITUENT ELEMENT |
|---|---|
| eMBB | NFE#1, NFE#2 |
| car | NFE#1, NFE#2, NFE#3, NFE#4 |

(b)

| NFE | CPU usage |
|---|---|
| NFE#1 | 10% |
| NFE#2 | 10% |
| NFE#3 | 10% |
| NFE#4 | 20% |
| NFE#5 | 10% |

(c)

| location | HW | CPU usage |
|---|---|---|
| DC#1 | server1 | 30% |
|  | server2 | 40% |
| DC#2 | server3 | 50% |
| DC#3 | server4 | 20% |
|  | server5 | 80% |

Fig.6

| User ID | Service Type | precedence list | | |
| --- | --- | --- | --- | --- |
| | | 1 | 2 | 3 |
| 001 | intra car communication | NS-car | NS-eMBB | NS-XX |
| 002 | intra car communication | NS-car | | |
| 003 | intra car communication | NS-car | NS-YY | NS-ZZ |

| SERVICE | REQUIRED CONDITION TO BE SATISFIED (SLA-SL) |
|---|---|
| NS-car | 2,2,2,2 |
| NS-eMBB | 3,2,2,2 |
| NS-XX | 3,3,3,3 |
| NS-YY | 1,2,2,1 |
| NS-ZZ | 1,1,1,1 |

(b)

| User ID | CONTRACT INFORMATION |
|---|---|
| 001 | CONNECTING TO ANOTHER SLICE SATISFYING SLA-SL AND CONTINUING SERVICE HAVING HIGH QUALITY |
| 002 | NOT CONNECTING IN CASE IN WHICH CONNECTION CANNOT BE MADE AND LOWERING USAGE FEE |
| 003 | CONTINUING SERVICE REGARDLESS OF DEGRADATION OF QUALITY |

| SLICE | REQUIRED CONDITION TO BE SATISFIED (SLA-SL) | USE STATUS |
|---|---|---|
| SLICE 1 | 2,2,2,2 | 50% |
| SLICE 2 | 1,2,2,2 | 40% |
| SLICE 3 | 3,3,3,3 | 30% |

(b)

| SERVICE | REQUIRED CONDITION TO BE SATISFIED (SLA-SL) | PRIORITY LEVEL |
|---|---|---|
| SERVICE 1 | 1,1,1,1 | ① SLICE 2<br>② SLICE 1<br>③ SLICE 3 |

| SLICE | REQUIRED CONDITION TO BE SATISFIED (SLA-SL) | USE STATUS |
|---|---|---|
| SLICE 1 | 2,2,2,2 | 50% |
| SLICE 2 | 1,2,2,2 | 80% |
| SLICE 3 | 3,3,3,3 | 30% |

(b)

| SERVICE | REQUIRED CONDITION TO BE SATISFIED (SLA-SL) | PRIORITY LEVEL |
|---|---|---|
| SERVICE 1 | 1,1,1,1 | ① SLICE 1<br>② SLICE 3 |

| parameter / degree | 0 | 1 | 2 | 3 |
|---|---|---|---|---|
| latency(ms) | 100~ | ~100 | ~10 | ~1 |
| mobility(km/h) | N/R | ~30 | ~200 | 200~ |
| throughput(Mbps) | ~1 | ~10 | ~50 | 50~ |
| UE density(km$^2$) | N/R | ~400 | ~2500 | 2500~ |

(b)

| service | latency (ms) | | mobility (km/h) | | throughput (Mbps) | | UE density (km$^2$) | |
|---|---|---|---|---|---|---|---|---|
| 1.pervasive video | 10 | 2 | 100 | 2 | 300 | 3 | 2500 | 2 |
| 2.operator cloud service | 10 | 2 | 100 | 2 | 300 | 3 | 2500 | 2 |
| 3.dense urban society | 10 | 2 | 100 | 2 | 300 | 3 | 2500 | 2 |
| 4.smart office | 10 | 2 | 5 | 1 | 1000 | 3 | 75000 | 3 |
| 5.HD Video sharing in stadium | 10 | 2 | 5 | 1 | 50 | 2 | 150000 | 3 |

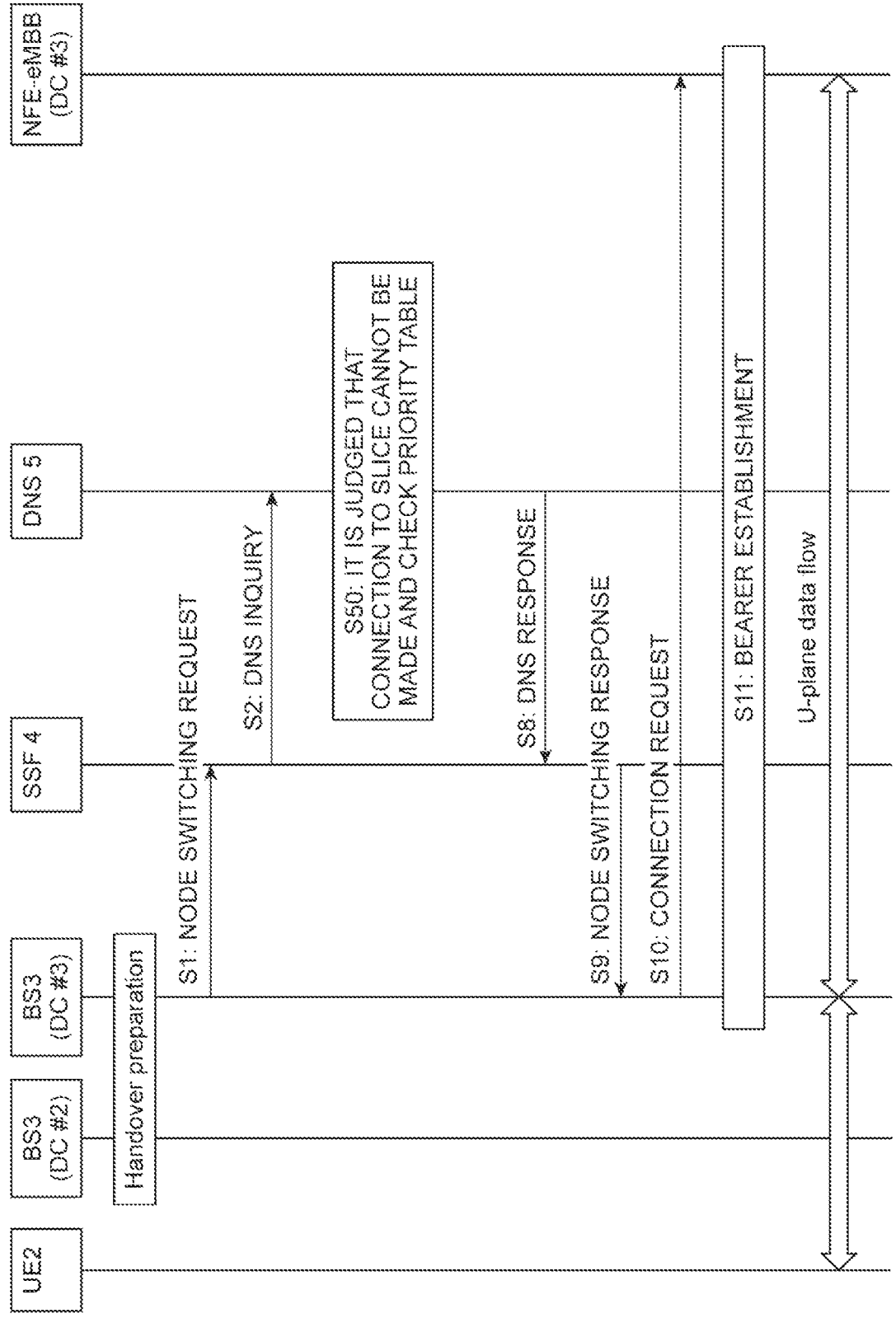

SLICE MANAGEMENT SYSTEM AND SLICE MANAGEMENT METHOD

TECHNICAL FIELD

The present invention relates to a slice management system and a slice management method.

BACKGROUND ART

A network system using a conventional virtualization technology, by using a virtualization technology disclosed in Non-Patent Literature 1, generates slices that are virtual networks logically generated on a network infrastructure by virtually dividing hardware resources. By allocating services to the slices, the services can each be provided using networks of independent slices. Accordingly, in a case in which slices are allocated to services having various required conditions, the required conditions of each service can be easily satisfied, and the signaling processes and the like thereof can be reduced.

CITATION LIST

Non Patent Literature

[Non-Patent Literature 1] Akihiro Nakao, "Virtualization-node project: Virtualization technology for new generation network," [online], July 2010, National Institute of Information and Communications Technology, [Accessed Jan. 26, 2016], Internet <www.nict.go.jp>.

SUMMARY OF INVENTION

Technical Problem

In a case in which a terminal is to receive a service from a slice of the network system described above, the terminal requests connection to a slice with a service type designated. Accordingly, the terminal is connected to a slice that is uniquely specified from the designated service type. Here, in the network system, in a case in which a slice that is uniquely specified from the service type designated by the terminal is not provided, for example, even when there is another slice from which provision of the service requested from the terminal can be sufficiently received, connection to the slice is rejected, and the terminal cannot receive the provision of the service.

The present invention is in view of such problems, and an object thereof is to provide a slice management system and a slice management method capable of more flexibly determining a slice to which a terminal is connected.

Solution to Problem

In order to solve the problems described above, according to one aspect of the present invention, there is provided a slice management system managing slices that are virtual networks generated on a network infrastructure. The slice management system comprises a memory storing a priority list in which slices of connection destination candidates of a terminal are aligned in order of priority levels, and, in a case in which a connection request for a slice from the terminal is acquired, the slice management system determines a slice to which the terminal is to be connected on the basis of the priority list stored in the memory. By employing such a configuration, a slice to which the terminal is to be connected is determined on the basis of the priority list in which slices of connection destination candidates of the terminal are aligned in the order of the priority levels. For example, by determining a slice to which the terminal is to be connected from among two or more slices of the connection destination candidates, the slice to which the terminal can be connected can be determined more reliably. In other words, a slice to which the terminal is connected can be determined more flexibly. Accordingly, the terminal has a high possibility of receiving provision of a service without connection of the terminal to a slice being rejected.

In addition, in the slice management system according to one aspect of the present invention, the slices of the connection destination candidates comprised in the priority list may be associated with each user of the terminal, and, in a case in which the connection request for a slice from the terminal is acquired, the slice management system may determine a slice to which the terminal is to be connected on the basis of the slices of the connection destination candidates associated with the user of the terminal in the priority list. By employing such a configuration, a slice to which the terminal is to be connected is determined on the basis of slices of the connection destination candidates associated with the user of the terminal, and accordingly, for example, the terminal can be connected to a slice according to a request from each user of the terminal. In this way, the terminal can be connected to a more appropriate slice.

In addition, in the slice management system according to one aspect of the present invention, the slices of the connection destination candidates comprised in the priority list may be associated with each service requested from the terminal, and, in a case in which the connection request for a slice from the terminal is acquired, the slice management system may determine a slice to which the terminal is to be connected on the basis of the slices of the connection destination candidates associated with the service requested from the terminal in the priority list. By employing such a configuration, a slice to which the terminal is to be connected is determined on the basis of slices of the connection destination candidates associated with a service requested from the terminal, and accordingly, for example, the terminal can be connected to a slice according to a service requested from the terminal. In this way, the terminal can be connected to a more appropriate slice.

In addition, in the slice management system according to one aspect of the present invention, the slices of the connection destination candidates comprised in the priority list may comprise a slice of a roaming destination. By employing such a configuration, the slice of the roaming destination can be determined as a connection candidate as well, whereby the number of options for slices of connection candidates of the terminal is increased. In this way, the terminal has a high possibility of receiving provision of a service without connection of the terminal to a slice being rejected.

In addition, in the slice management system according to one aspect of the present invention, the priority list may be updated on the basis of at least one of operation statuses of managed slices, service required conditions of a service requested from the terminal, service required conditions of managed slices, and contract information of a user of the terminal. By employing such a configuration, the priority list can be updated dynamically and flexibly on the basis of at least one of the operation statuses of managed slices, service required conditions of a service requested from the terminal, service required conditions of managed slices, and contract information of users of the terminal. Accordingly, the terminal can be connected to a more appropriate slice.

In addition, in the slice management system according to one aspect of the present invention, in a case in which a connection request for a slice from a terminal has been acquired, it may be judged whether or not a slice to which the terminal is connected in a moving source area can be connected in a moving destination area that is a destination of movement of the terminal, and, in a case in which it is judged that the connection cannot be made, one or more slices of the connection destination candidates may be selected on the basis of the priority list, and a slice to which the terminal is to be connected may be determined on the basis of the order of the priority levels among the selected slices. By employing such a configuration, also in a case in which the terminal cannot be connected to the slice connected in the moving source area in the moving destination area, a slice to which the terminal is connected is determined more reliably, and accordingly, the terminal can be connected to the slice more reliably.

Meanwhile, one aspect of the present invention can be described as an invention of a slice management method as will be described below in addition to being described as the invention of the slice management system as described above. These are substantially the same invention differing only in category, and the same operations and effects are acquired.

In other words, according to one aspect of the present invention, there is provided a slice management method executed by a slice management system managing slices that are virtual networks generated on a network infrastructure, the slice management method comprising: a determination step of determining a slice to which a terminal is to be connected on the basis of a priority list, in which slices of connection destination candidates of the terminal are aligned in order of priority levels, stored in the memory in a case in which a connection request for a slice from the terminal is acquired.

In addition, in the slice management method according to one aspect of the present invention, the slices of the connection destination candidates comprised in the priority list may be associated with each service requested from the terminal, and, in the determination step, in a case in which the connection request for a slice from the terminal is acquired, a slice to which the terminal is to be connected may be determined on the basis of the slices of the connection destination candidates associated with the service requested from the terminal in the priority list.

In addition, the slice management method according to one aspect of the present invention may further comprise a judgement step of judging whether or not a slice to which the terminal is connected in a moving source area can be connected in a moving destination area that is a destination of movement of the terminal in a case in which a connection request for a slice from the terminal is acquired, and, in the determination step, in a case in which it is judged that the connection cannot be made in the judgement step, one or more slices of the connection destination candidates are selected on the basis of the priority list, and a slice to which the terminal is to be connected may be determined on the basis of the order of the priority levels among the selected slices.

Advantageous Effects of Invention

A slice to which a terminal is connected can be determined more flexibly.

BRIEF DESCRIPTION OF DRAWINGS

FIG. 4 is a diagram illustrating an example of a table of slice information stored in a memory (DNS).

FIG. 5 is a diagram illustrating an example of a table of the amounts of resources stored in memories (NFVO, VNFM, and VIM).

FIG. 6 is a diagram illustrating an example of a table of a priority list stored in a memory (SSF).

FIG. 7 is a diagram illustrating examples of a table of service required conditions of slices that are managed and a table of contract information of users of terminals.

FIG. 8 is a diagram (1) illustrating examples of a table of operation statuses of slices that are managed and a table of service required conditions of a service requested from a terminal.

FIG. 9 is a diagram (2) illustrating examples of a table of operation statuses of slices that are managed and a table of service required conditions of a service requested from a terminal.

FIG. 10 is a diagram illustrating SLA-SL.

FIG. 17 is a flowchart (a priority list storing edition using an independent repository) illustrating a process executed in a slice management system (slice management method) according to an embodiment of the present invention.

DESCRIPTION OF EMBODIMENTS

Hereinafter, embodiments of a slice management system and a slice management method will be described in detail with reference to the drawings. In description of the drawings, the same reference signs will be assigned to the same elements, and duplicate description thereof will not be presented.

First, main differences between a conventional technology and a slice management system 1 according to an embodiment of the present invention will be described with reference to FIGS. 1 and 2.

Figure 1:
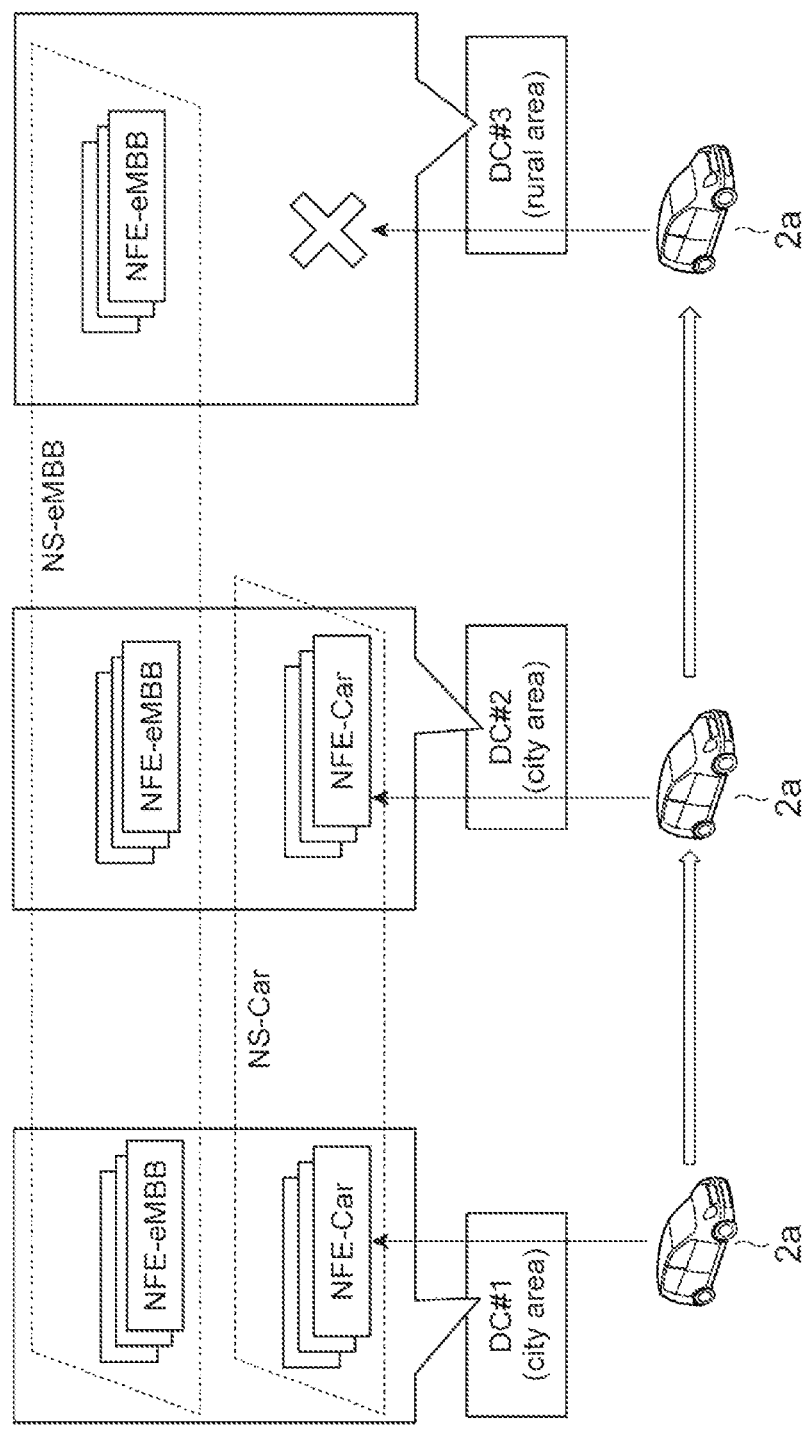
FIG. 1 is a diagram illustrating slice connection at the time of movement of a terminal between areas in a conventional technology.

FIG. 1 is a diagram illustrating slice connection at the time of movement of a terminal between areas in a conventional technology. As illustrated in FIG. 1, DC #1, DC #2, and DC #3 that are three data centers (DC) have bases at geographically different places. Each DC forms a slice over DCs using a network infrastructure included in the DC. A slice (or a network slice) is a virtual network or a service network logically generated on a network infrastructure by virtually dividing resources of links and nodes of a network apparatus and combining the divided resources, and thus the slices divide resources and do not interfere with each other. A service is a service using network resources such as a communication service (a dedicated line service or the like) or an application service (video delivery, a service using a sensor device such as an embedded device).

As illustrated in FIG. 1, DC #1 and DC #2 from a Network Slice (NS)-Car that is a slice over DC #1 and DC #2. In addition, the NS-Car includes a Network Function Entity (NFE)-Car that is a functional entity of a slice generated in each DC as its constituent element. The NS-Car provides an inter-car mobile communication service for a terminal (car). As service required conditions in the NS-Car, low latency and a local internal communication are required.

In addition, DC #1, DC #2, and DC #3 form an NS-evolved mobile broad band (eMBB) that is a slice over DC #1, DC #2, and DC #3. In addition, the NS-eMBB includes an NFE-eMBB that is a functional entity of a slice generated in each DC as its constituent element. The NS-eMBB has the same role as an existing mobile phone communication network and provides a mobile communication service enabling an Internet connection for a terminal. As a service required condition in the NS-eMBB, a delay and a frequency band that are of a level of an existing mobile phone communication network are required.

In addition, in this whole embodiment, a provision range of a mobile communication service provided by a slice formed by a network infrastructure included in each DC (a range in which a terminal can perform radio communication) will be referred to as an area. In addition, for the convenience of description, a DC may be referred to as an area. In FIG. 1, DC #1 and DC #2 are city areas, and DC #3 is a rural area. The NS-Car is formed (covered) in the city areas of DC #1 and DC #2 but is not formed (covered) in the rural area of DC #3. On the other hand, the NS-eMBB is widely formed in the city areas of DC #1 and DC #2 and the rural area of DC #3.

FIG. 1 illustrates a scenario in which a car 2a that is a terminal capable of accessing a mobile communication service provided by the NS-Car sequentially moves between areas of the city area of DC #1, the city area of DC #2, and the rural area of DC #3. First, the car 2a is connected to the NS-Car in the city area of DC #1 and, also after moving to the city area of DC #2, can be continuously connected to the NS-Car (of the city area of DC #2). However, upon moving to the rural area of DC #3 thereafter, the car 2a cannot be connected to the NS-Car since the NS-Car is not formed in the rural area of DC #3. In other words, in the conventional technology, the car 2a that has moved to the rural area of DC #3 in this way cannot be continuously connected to the NS-Car to which it was connected in the city areas of DC #1 and DC #2.

Figure 2:
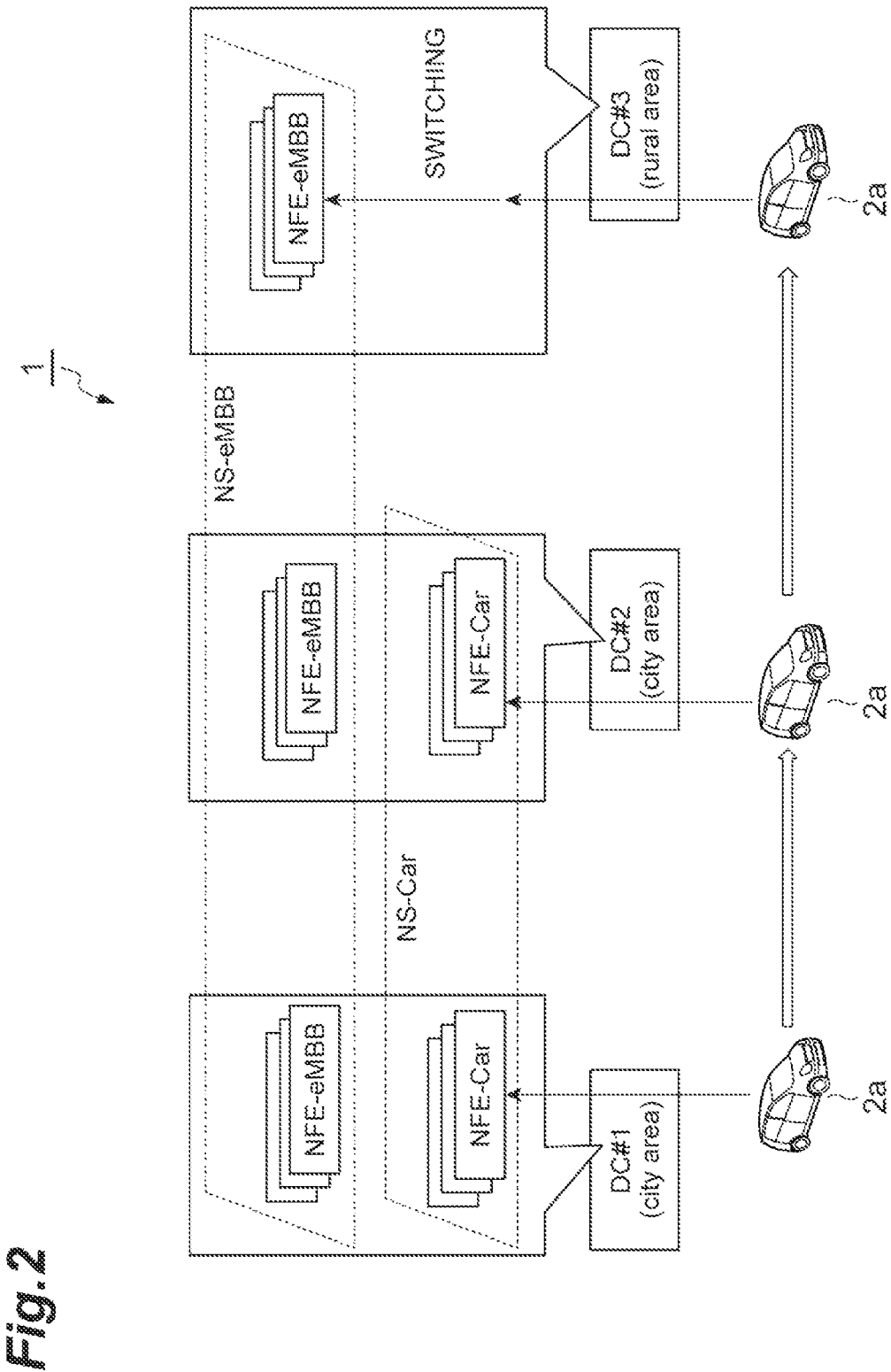
FIG. 2 is a diagram illustrating slice connection at the time of movement of a terminal between areas in a slice management system according to an embodiment of the present invention.

FIG. 2 is a diagram illustrating slice connection at the time of movement of a terminal between areas in the slice management system 1. Description of the same content as illustrated in FIG. 1 will not be presented. When the car 2a moves to the rural area of DC #3, the slice management system 1 judges whether or not the car 2a is can be continuously connected to the NS-Car to which it was connected in the city area of DC #2. In a case in which it is judged that the connection cannot be made, the connection from the car 2a is switched to the NS-eMBB that is a slice that can provide a service corresponding to the NS-Car and is formed also in DC #3 such that the car 2a can be continuously connected to a slice that can provide a service corresponding to the NS-Car. As above, in the slice management system 1, by switching the connection to the NS-Car to the NS-eMBB, the car 2a that has moved to the rural area of DC #3 can be continuously connected to the NS-eMBB that can provide a service corresponding to the NS-Car to which it was connected in the city areas of DC #1 and DC #2.

Figure 3:
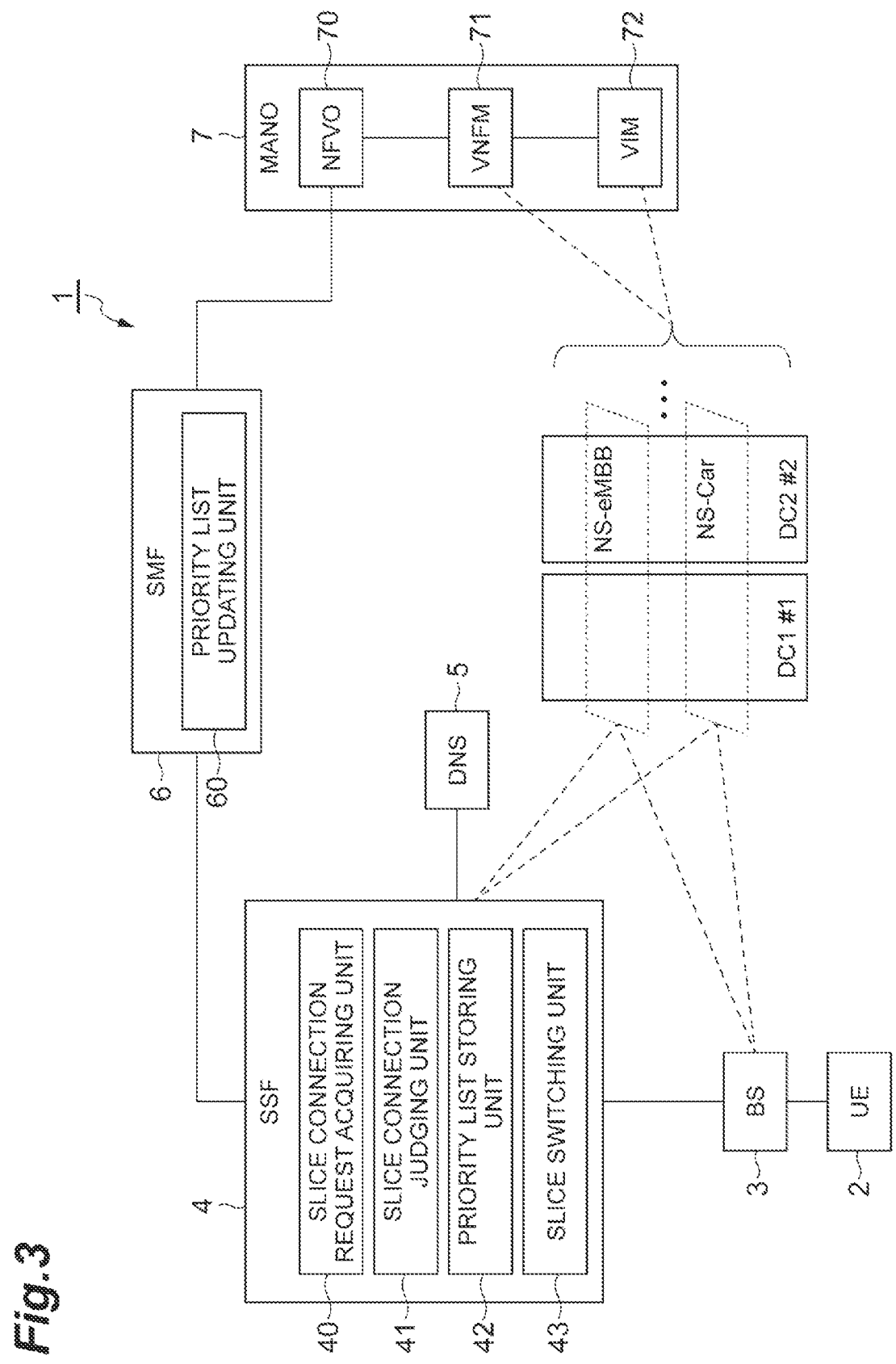
FIG. 3 is a system configuration diagram of a slice management system according to an embodiment of the present invention.

Next, details of the slice management system 1 will be described. FIG. 3 is a system configuration diagram of the slice management system 1. As illustrated in FIG. 3, the slice management system 1 (slice management system) is configured to include a user equipment (UE) 2 (terminal), a base station (BS) 3, a slice selection function (SSF) 4, a domain name system (DNS) 5 (memory), a service-slice mapping function (SMF) 6, and a management and orchestration (MANO) 7. In addition, the slice management system 1 may not include some of these constituent elements or may include other constituent elements.

In this embodiment, the slice management system 1 provides a communication function for the UE 2 that is a mobile communication terminal using a virtual server operating in a virtual machine realized on a physical server. In other words, the slice management system 1 is a virtualized mobile communication network. The communication function is provided for a mobile communication terminal by executing a communication process according to the communication function using a virtual machine. The slice management system 1 includes or may include constituent elements defined in 4G (fourth-generation mobile communication standard), 5G (fifth-generation mobile communication standard), a network functions virtualization (NFV) architecture, and the like, and description of details of such constituent elements will be appropriately omitted.

The UE 2 is a mobile communication terminal capable of performing mobile communication by being connected to a mobile communication network provided by the slice management system 1. In this embodiment, the UE 2 is a car having a mobile communication function. The UE 2 is connected to a slice managed (formed) by the slice management system 1 by transmitting a slice connection request that is information indicating a request for connection to the slice to the BS 3 and can receive a service provided by the slice. When a slice connection request is transmitted, the UE 2 transmits the slice connection request with "UE Usage Type" and "Service Type" included therein as parameters used for designating a service requested to be received, in other words, a slice to which connection is requested, to the slice management system 1.

"UE Usage Type" is information representing "a terminal used for executing a certain service" set for each UE 2 or each user of the UE 2. Specific examples of "UE Usage Type" include "mobile phone" representing a mobile phone, car "car" (connected to a network), and the like.

"Service Type" is information that is set independently from "UE Usage Type" and is information storing "a certain service to be executed." Specific examples of "Service Type" include "voice call" indicating a voice communication service, "movie streaming" indicating a video streaming service, "eMBB" indicating an eMBB service, "intra car communication" indicating an inter-car communication service, and the like.

The UE 2 may include terminal identification information used for identifying the UE 2, user identification information used for identifying a user of the UE 2, and cell identification information used for identifying a cell of the BS 3 in which the UE 2 is present, and the like in the slice connection request in addition to "UE Usage Type" and "Service Type." In addition, when moving across areas (when moving between areas), the UE 2 transmits a slice connection request (to a BS 3 of a moving destination area) in a moving destination area.

The BS 3 is a general base station. When a slice connection request is received from the UE 2, the BS 3 transmits the received slice connection request to the SSF 4. When a received slice connection request is transmitted to the SSF 4, the BS 3 may transmit the slice connection request with cell identification information used for identifying a cell of the BS 3 in which the UE 2 that has transmitted the slice connection request is present and the like included therein.

The BS 3 receives slice connection destination information relating to a slice that is a connection destination of the UE 2 or connection destination error information indicating that a slice that is a connection destination cannot be determined as a response to the transmission of a slice connection request to the SSF 4. In a case in which the slice connection destination information is received from the SSF 4, the BS 3 connects the UE 2 that has transmitted the slice connection request to a slice represented by the received slice connection destination information. On the other hand, in a case in which the connection destination error information is received from the SSF 4, the BS 3 transmits the received connection destination error information to the UE 2. In addition, when the connection destination error information is received, the UE 2 judges that connection to a slice cannot be made.

The SSF 4 is an independent node (a server device or the like). When a slice connection request is received from the BS 3, the SSF 4 determines a slice to which the UE 2 that has transmitted the slice connection request is to be connected on the basis of the received slice connection request, and in a case in which a slice that is a connection destination is determined, transmits slice connection destination information relating to the slice that is the connection destination to the BS 3. In a case in which a slice that is the connection destination cannot be determined, the connection destination error information representing an indication thereof is transmitted to the BS 3. Details of the SSF 4 (functional blocks illustrated in FIG. 3) will be described later.

The DNS 5 is a node that provides a service of a general DNS. The DNS 5 stores slice information relating to a slice to which the UE 2 can be connected for each area managed in the slice management system 1. The slice information includes DC identification information used for identifying a DC to which a slice is provided, cell identification information used for identifying a cell in the DC to which the slice is provided, slice identification information used for identifying the slice, and an IP address of the slice. In addition, the slice information may be associated with each "UE Usage Type" and "Service Type."

FIG. 4 is a diagram illustrating an example of a table of slice information stored in the DNS 5. In slice information illustrated in FIG. 4(*a*), "UE Usage Type" is "car," "Service Type" is associated with "eMBB," and a slice represented by the slice information represents a slice used for a car to execute the eMBB service. In addition, a first record in the example of the table illustrated in FIG. 4(*a*) represents that a slice of which the slice identification information is "eMBB" is formed in cells #1 to #10 of DC #1, and an IP address thereof is "aa.aa.aa.aa." Similarly, in slice information illustrated in FIG. 4(*a*), "UE Usage Type" is "car," "Service Type" is associated with "intra car communication," and a slice represented by the slice information represents a slice used for a car to execute an inter-car communication service. In addition, a third record in the example of the table illustrated in FIG. 4(*b*) represents that a slice used for a car to execute the inter-car communication service is not formed (provided) in cells #11 to #30 of DC #3.

Referring back to FIG. 3, the SMF 6 is a node that performs management of slices or performs update of a priority list to be described later. Details of the SMF 6 (functional blocks illustrated in FIG. 3) will be described later.

The MANO 7 is an architecture used for managing resources relating to slices. As illustrated in FIG. 3, the MANO 7 is configured to include an NFVO 70, a VNFM 71, and a VIM 72.

The NFVO 70 is a node that manages the VNFM 71 and the VIM 72 and performs generation/removal of a slice and acquisition of a resource operation status in accordance with an instruction from the SMF 6. The VNFM 71 is a node that performs resource management of software resources of slices in a DC. The VIM 72 is a node that performs resource management of physical and logical hardware resources of slices in a DC.

For example, when a slice generation instruction that is information indicating an instruction for generating a slice is received from the SMF 6, the NFVO 70 causes the VNFM 71 and the VIM 72 to acquire resources on a corresponding DC, configures an NFE for a slice on the DC, and generates a slice. For example, on the other hand, when a slice removal instruction that is information indicating an instruction of removal of a slice is received from the SMF 6, the NFVO 70 causes the VNFM 71 and the VIM 72 to remove an NFE for a slice on a corresponding DC, releases resources on the DC, and removes the slice. Here, the NFE configured on the DC may be configured to be divided into an NFE for a U-Plane and an NFE for a C-Plane.

FIG. 5 is a diagram illustrating an example of a table of the amount of resources stored in the NFVO 70, the VNFM 71, and the VIM 72. FIG. 5(*a*) is an example of a table of the amount of resources stored in the NFVO 70. In the example of the table illustrated in FIG. 5(*a*), slice identification information and identification information of constituent elements (identification information of NFEs) of a slice represented by the slice identification information are associated with each other. FIG. 5(*b*) is an example of a table of the amount of resources stored in the VNFM 71. In the example of the table illustrated in FIG. 5(*b*), identification information of an NFE that is a constituent element of a slice and the CPU usage ratio of the NFE are associated with each other. FIG. 5(*c*) is an example of a table of the amount of resources stored in the VIM 72. In the example of the table illustrated in FIG. 5(*c*), DC identification information used for identifying a DC, identification information of hardware present in the DC, and the CPU usage ratio of the hardware are associated with each other.

In addition, by transmitting a resource operation status acquiring instruction that is information indicating instructing each of the NFVO 70, the VNFM 71, and the VIM 72, the SMF 6 acquires a resource operation status, the SMF 6 acquires the table of the amount of resources stored in each of the NFVO 70, the VNFM 71, and the VIM 72 as responses thereof and stores the acquired tables in the SMF 6. By regularly transmitting a resource operation status acquiring instruction, the SMF 6 stores the latest amounts of resources of the NFVO 70, the VNFM 71, and the VIM 72 in the SMF 6 and judges whether or not a slice can be built on a specific DC on the basis of the stored latest amounts of resources and the like.

One or more of the BS 3, the SSF 4, the DNS 5, the SMF 6, the NFVO 70, the VNFM 71, and the VIM 72 included in the slice management system 1 described above may be realized by a physical server device or the like as described above or may be realized by executing a program on a physical server device. In addition, two or more of the BS 3, the SSF 4, the DNS 5, the SMF 6, NFVO 70, the VNFM 71, and the VIM 72 may be realized by one physical server device or the like or may be realized by executing a program on one physical server device. In addition, the SSF 4 may be configured from a mobility management entity (MME), a home subscribed server (HSS), and a DNS in a third generation partnership project (3GPP).

Subsequently, each functional block of the SSF 4 illustrated in FIG. 3 will be described.

A slice connection request acquiring unit 40 receives (acquires) a slice connection request from the UE 2 through the BS 3 and transmits the received slice connection request to a slice connection judging unit 41.

When a slice connection request is received from the slice connection request acquiring unit 40, the slice connection judging unit 41 judges whether or not the UE 2 can be connected, in a moving destination area, to a slice to which it was connected in a moving source area when the UE 2 is moving between areas on the basis of the slice information stored in the DNS 5. More specifically, when a slice connection request is received from the slice connection request acquiring unit 40, by comparing "UE Usage Type," "Service Type," and the cell identification information included in a slice connection request received in the previous time from a UE 2 represented by the terminal identification information included in the received slice connection request with those included in the slice connection request received this time, the slice connection judging unit 41 judges whether or not the UE 2 is moving between areas and whether or not the UE 2 attempts to be connected to the same slice of the previous time. In addition, in order to make a comparison with the slice connection request received in the previous time, the SSF 4 sores a history of past slice connection requests. In a case in which the UE 2 is moving between areas and is attempting to be connected also in a moving destination area to a slice to which it was connected in a moving source area, the slice connection judging unit 41 inquiries about an IP address of the slice requested to be connected from the UE 2 by making a DNS query to the DNS 5 using "UE Usage Type," "Service Type," and the cell identification information included in the slice connection request received this time as arguments.

For example, in a case in which a table of the slice information stored in the DNS 5 is the table illustrated in FIG. 4, "UE Usage Type" included in the slice connection request is "car," "Service Type" is "eMBB," and the cell identification information is "#22," it corresponds to the third record of the table illustrated in FIG. 4(*a*), and thus, the slice connection judging unit 41 receives an IP address "cc.cc.cc.cc" as a DNS response from the DNS 5. In this way, in a case in which an IP address of the slice requested to be connected from the UE 2 has been acquired, the slice connection judging unit 41 judges that the UE 2 can be connected in a moving destination area to the slice to which it was connected in a moving source area when the UE 2 is moving between areas. Subsequently, the slice connection judging unit 41 returns the acquired IP address to the BS 3 and connects the UE 2 to a slice represented by the IP address.

In addition, for example, in a case in which "UE Usage Type" included in the slice connection request is "car," "Service Type" is "intra car communication," and the cell identification information is "#28," it corresponds to the third record of the table illustrated in FIG. 4(*b*), but a slice corresponding to DC #3 is not present (in a case in which the slice identification information and the IP address are blank, it represents that the slice is not present). In such a case, the slice connection judging unit 41 receives information indicating that a slice to be connected is not present as a DNS response from the DNS 5. In this way, in a case in which a slice requested to be connected from the UE 2 is not present, the slice connection judging unit 41 judges that the UE 2 cannot be connected in a moving destination area to the slice to which it was connected in a moving source area, in a case in which the UE 2 is moving between areas. In a case in which it is judged that the UE 2 cannot be connected, the slice connection judging unit 41 transmits the information included in the received slice connection request to the slice switching unit 43.

When a slice connection request is received from the slice connection request acquiring unit 40, the slice connection judging unit 41 may judge whether or not a slice requested in the received slice connection request can be connected on the basis of the slice information stored in the DNS 5. The judgement is similar to the judgement described above.

A priority list storing unit 42 stores a priority list in which slices of connection destination candidates of the UE 2 are aligned in order of the priority levels. FIG. 6 is a diagram illustrating an example of a table of a priority list stored in the priority list storing unit 42. In the example of the table illustrated in FIG. 6, a priority list ("precedence list" column) is included in which user identification information ("User ID" column) of each UE 2 that is a target of the priority list, a type of a service ("Service Type" column) requested from the UE 2, which is "Service Type" described above, and slices of connection destination candidates of the UE 2 are aligned in order of the priority levels. For example, in the example of the table illustrated in FIG. 6, a first record illustrates a priority list in which, for a user whose user identification information is "001" and who requests "intra car communication" as "Service Type," first, an "NS-Car" slice, next an "NS-eMBB" slice, and next an "NS-XX" slice are represented as candidates of the connection destination as priority levels. In addition, in the priority list, at least one of the user identification information and "Service Type" may not be associated as described above.

The priority list stored in the priority list storing unit 42 may include a slice of a roaming destination. A slice of a roaming destination is, for example, a slice managed by a mobile communication company other than a mobile communication company managing the slice management system 1. Slice specifying information that can be used for specifying a slice, for example, an IP address is associated with a slice of a roaming destination among slices included in the priority list. In addition, a flag value representing whether or not a slice is a roaming destination may be associated with each slice included in the priority list.

The slice switching unit 43 receives information included in the slice connection request received from the slice connection judging unit 41 and determines a slice to which the UE 2 is connected on the basis of the received information and the priority list stored in the priority list storing unit 42. For example, the slice switching unit 43 extracts user identification information and "Service Type" included in the slice connection request and acquires a priority list corresponding to the user identification information and "Service Type" that have been extracted from among priority lists stored in the priority list storing unit 42. Then, the slice switching unit 43 makes a DNS inquiry for the DNS 5 about whether each of the slices that are candidates of the connection destination included in the acquired priority list can be connected in order of priority levels and determines a slice that can be connected as the slice to which the UE 2 is to be finally connected.

In a case in which only one of the user identification information and "Service Type" is included in the slice connection request, the slice switching unit 43 may acquire a priority list corresponding to the one thereof. In addition, in a case in which both the user identification information and "Service Type" are not included therein, the slice switching unit 43 may acquire all the priority lists stored in the priority list storing unit 42. For example, in a case in which a slice connection request includes not "Service Type" but the user identification information, the slice switching unit 43 determines a slice to which the UE 2 is to connected on the basis of a slice of a connection destination candidate associated with a user identified by the user identification information among priority lists stored in the priority list storing unit 42. On the other hand, for example, in a case in which a slice connection request includes not the user identification information but "Service Type," the slice switching unit 43 determines a slice to which the UE 2 is to connected on the basis of a slice of a connection destination candidate associated with a service represented by "Service Type" (requested by the UE 2) among the priority lists stored in the priority list storing unit 42.

When a slice to which the UE 2 is to be connected is determined, the slice switching unit 43 transmits a node switching response including information relating to the determined slice to the BS 3. When a slice of a roaming destination is determined, the slice switching unit 43 transmits a node switching response also including slice specifying information associated with the slice in the priority list to the BS 3. The BS 3 makes connection (bearer establishment) with a corresponding slice on the basis of the information relating to the slice or the slice specifying information included in the received node switching response.

In addition, the priority list storing unit 42 is not limited to be included in the SSF 4 but may be included in any one of the UE 2, the BS 3, and the DNS 5 and may be included in an independent repository (configured by a server device or the like), which is not illustrated in the drawing, included in the slice management system 1. In other words, the priority list storing unit 42 may be included in (a memory of) any node included in the slice management system 1. In such a case, the data processing with the priority list storing unit 42 performed by the slice switching unit 43 described above is realized by performing a data communication process with a node including the priority list storing unit 42.

Next, each functional block of the SMF 6 illustrated in FIG. 3 will be described.

The priority list updating unit 60 updates the priority list stored in the priority list storing unit 42 on the basis of at least one of the operation statuses of managed slices, the service required conditions of a service requested from the UE 2, the service required conditions of the managed slices, and contract information of a user of the UE 2. Hereinafter, update of the priority list using the priority list updating unit 60 will be described with reference to FIGS. 7 to 10.

In addition, as one example of a service level agreement sufficient level (SLA-SL), an example of tables of SLA-SL is illustrated in FIG. 10. The SLA-SL is set for each service and represents a degree of the function required for satisfying the service required conditions. The example of the table illustrated in FIG. 10(a) represents criteria represented by values of each parameter of the SLA-SL. The example of the table illustrated in FIG. 10(b) illustrates an example of the SLA-SLs of five services. For example, the first record of the example of the table illustrated in FIG. 10(b) represents that SLA-SLs relating to a "pervasive video" service are (2, 2, 3, 2). In other words, the service required condition required for "latency" is "10 ms," and thus, the first parameter value is "2" (in the example of the table illustrated in FIG. 10(a)), and the service required condition required for "mobility" is "100 km/h," and thus the second parameter value is "2." In addition, the service required condition required for "throughput" is "300 Mbps," and thus, the third parameter value is "3," and the service required condition required for "UE density" is "2500 km$^2$," and thus, the fourth parameter value is "2."

FIG. 7 is a diagram illustrating an example of a table (FIG. 7(a)) of service required conditions of managed slices that is stored by the SMF 6 and an example of a table (FIG. 7(b)) of contract information of users of UEs 2. The priority list updating unit 60 may generate (update) the priority list illustrated in FIG. 6 on the basis of the examples of the tables illustrated in FIGS. 7(a) and 7(b). For example, in a case in which SLA-SLs of a slice of which "Service Type" corresponds to "intra car communication" are (2, 2, 2, 2), according to the example of the table illustrated in FIG. 7(b), a user whose user identification information is "001" desires to "be connected to another slice satisfying the SLA-SLs and continue a service of high quality," and accordingly, on the basis of the example of the table illustrated in FIG. 7(a), the priority list updating unit 60 selects "NS-car," "NS-eMBB," and "NS-XX" in order of the priority levels to generate a priority list. Similarly, a user whose user identification information is "002" desires not to "be connected to a slice when it cannot be connected" and to "lower the usage fee instead," and accordingly, on the basis of the example of the table illustrated in FIG. 7(a), the priority list updating unit 60 selects only "NS-car" to generate a priority list. Similarly, a user whose user identification information is "003" desires to "continue the service regardless of degradation of the quality," and accordingly, on the basis of the example of the table illustrated in FIG. 7(a), the priority list updating unit 60 selects "NS-car," "NS-YY," and "NS-ZZ" in order of priority levels to generate a priority list. In addition, although "contract information" of the example of the table illustrated in FIG. 7(b) is represented in sentences for the convenience of description, actually, the contract information is assumed to be stored in a form that can be easily processed by a computer. In addition, the priority list updating unit 60 may generate (update) the priority list on the basis of any one of the service required conditions of managed slices and contract information of a user of the UE 2.

FIG. 8 is a diagram illustrating an example of a table (FIG. 8(a)) of operation statuses of managed slices and an example of a table (FIG. 8(b)) of service required conditions of services requested from the UE 2 that are stored in the SMF 6. The priority list updating unit 60 may generate (update) the priority list illustrated in FIG. 6 on the basis of the examples of the tables illustrated in FIGS. 8(a) and 8(b). For example, in the example of the table illustrated in FIG. 8(b), the SLA-SLs of "service 1" are (1, 1, 1, 1), and accordingly, the priority list updating unit 60 selects "slice 2," "slice 1" and "slice 3" in order of priority levels to generate a priority list on the basis of the SLA-SLs and the resource use status for each slice represented in the example of the table illustrated in FIG. 8(a).

In addition, in a case in which there is a change in the operation status of the slice, and the example of the table illustrated in FIG. 8(a) is changed to an example of a table illustrated in FIG. 9(a) (the use status of "slice 2" changes from "40%" to "80%"), the priority list updating unit 60 performs update with a priority list in which "slice 1" and "slice 3" are aligned in order of priority levels on the basis of the change as illustrated in a "priority" column in FIG. 9(b).

The functional blocks of the SSF 4 and the SMF 6 illustrated in FIG. 3 have been described above.

Figure 11:
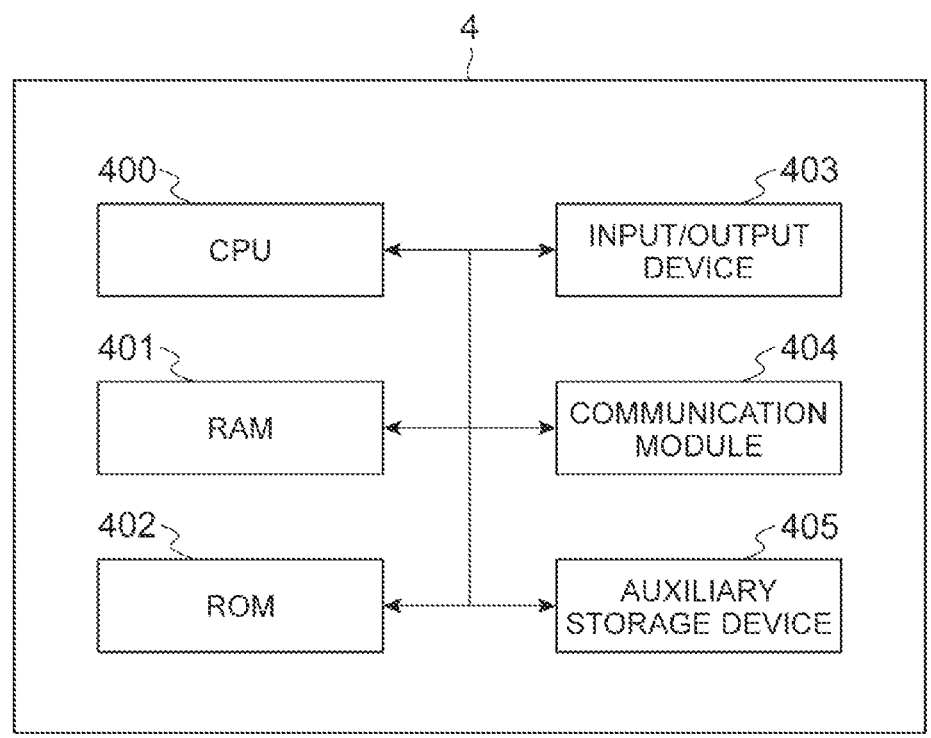
FIG. 11 is a diagram illustrating the hardware configuration of some devices (SSF) included in a slice management system according to an embodiment of the present invention.

Here, the SSF 4 is configured from hardware such as a CPU and the like. FIG. 11 is a diagram illustrating an example of the hardware configuration of the SSF 4. The SSF 4 illustrated in FIG. 3, as illustrated in FIG. 11, is physically configured as a computer system including one or a plurality of CPUs 400, a RAM 401 and a ROM 402 that are main storage devices, an input/output device 403 such as a display and the like, a communication module 404, an auxiliary storage device 405, and the like.

The function of each functional block of the SSF 4 illustrated in FIG. 3 is realized by operating the input/output device 403, the communication module 404, and the auxiliary storage device 405 under the control of the CPU 400 and executing reading/writing data from/in the RAM 401 by reading predetermined computer software onto hardware such as the CPU 400, the RAM 401, and the like illustrated in FIG. 11.

Figure 12:
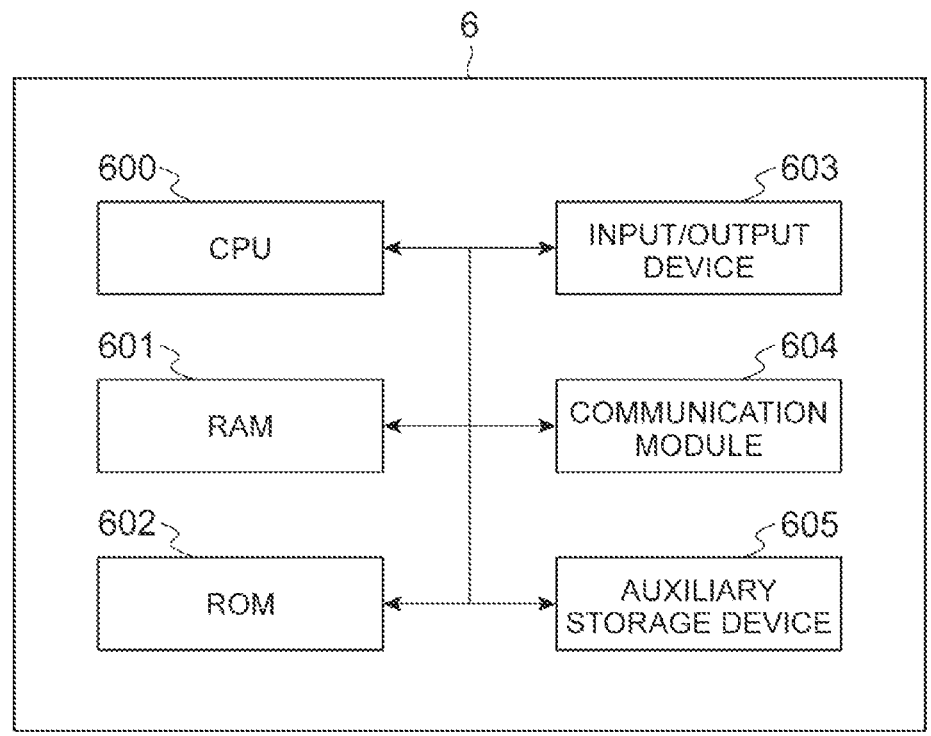
FIG. 12 is a diagram illustrating the hardware configuration of some devices (SMF) included in a slice management system according to an embodiment of the present invention.

Similarly, the SMF 6 is configured from hardware such as a CPU and the like. FIG. 12 is a diagram illustrating one example of the hardware configuration of the SMF 6. The SMF 6 illustrated in FIG. 3, as illustrated in FIG. 12, is physically configured as a computer system including one or a plurality of CPUs 600, a RAM 601 and a ROM 602 that are main storage devices, an input/output device 603 such as a display and the like, a communication module 604, an auxiliary storage device 605, and the like.

The function of each functional block of the SMF 6 illustrated in FIG. 3 is realized by operating the input/output device 603, the communication module 604, and the auxiliary storage device 605 under the control of the CPU 600 and executing reading/writing data from/in the RAM 601 by reading predetermined computer software onto hardware such as the CPU 600, the RAM 601, and the like illustrated in FIG. 12.

In addition, instead of executing each function illustrated in FIG. 3 using a processor such as the CPU 400, the CPU 600, or the like, by building all or some of the functions using a dedicated integrated circuit (IC), each function may be configured to be executed. For example, by building a dedicated integrated circuit used for performing image processing or communication control, the functions described above may be executed.

Software should be broadly interpreted to mean a command, a command set, a code, a code segment, a program code, a program, a subprogram, a software module, an application, a software application, a software package, a routine, a subroutine, an object, an executable file, an executable thread, an order, a function, and the like regardless whether it is called software, firmware, middleware, a microcode, or a hardware description language or any other name.

In addition, software, a command, or the like may be transmitted and received through a transmission medium. For example, in a case in which software is transmitted from a web site, a server, or any other remote source using a wired technology such as a coaxial cable, an optical fiber cable, a twisted pair or a digital subscriber line (DSL) and/or a wireless technology such as an infrared ray, radio, or a microwave, the such a wired technology and/or a wireless technology are included in the definition of the transmission medium.

Figure 13:
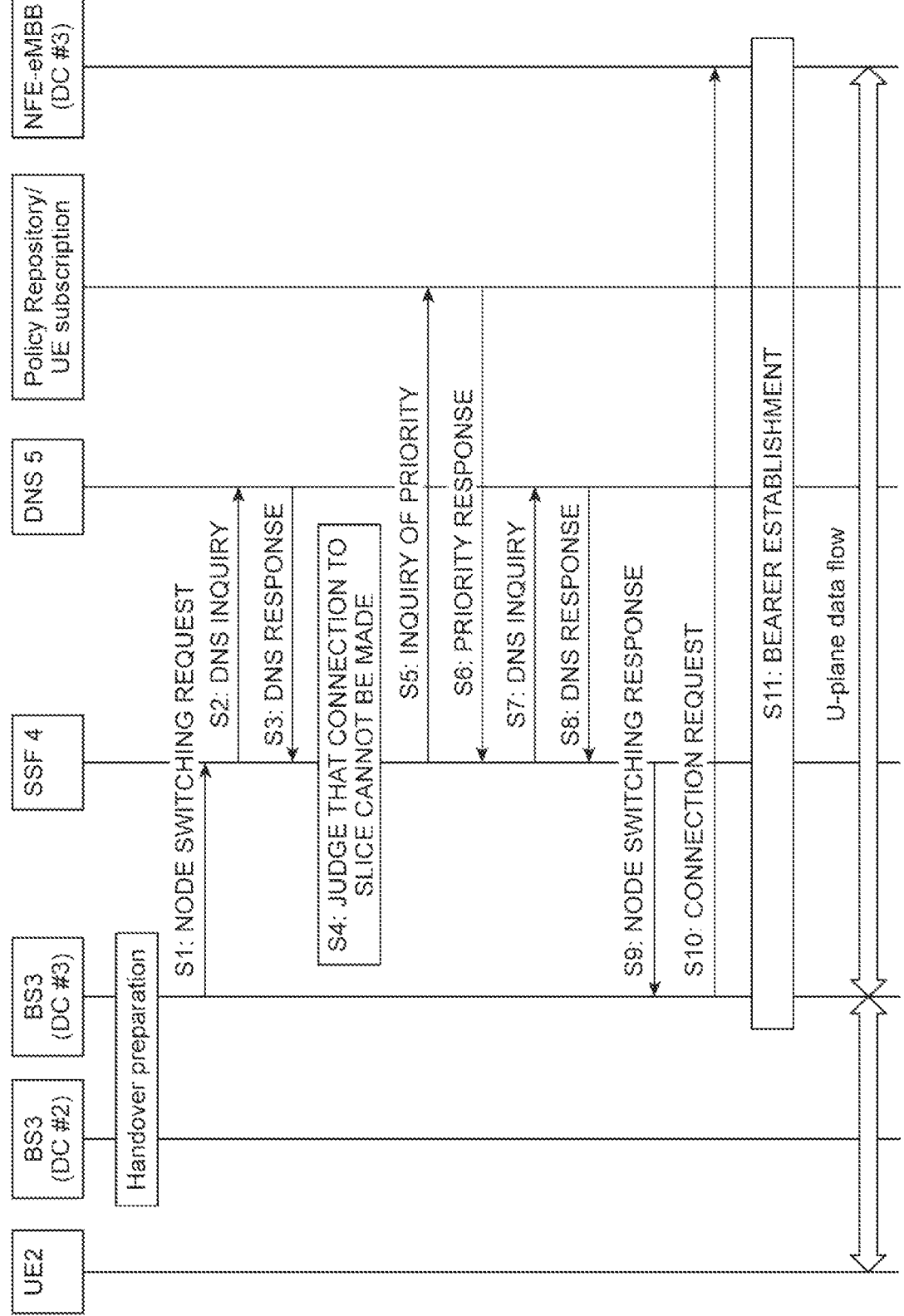
FIG. 13 is a flowchart (a priority list storing edition using the SSF) illustrating a process executed in a slice management system (slice management method) according to an embodiment of the present invention.
Figure 14:
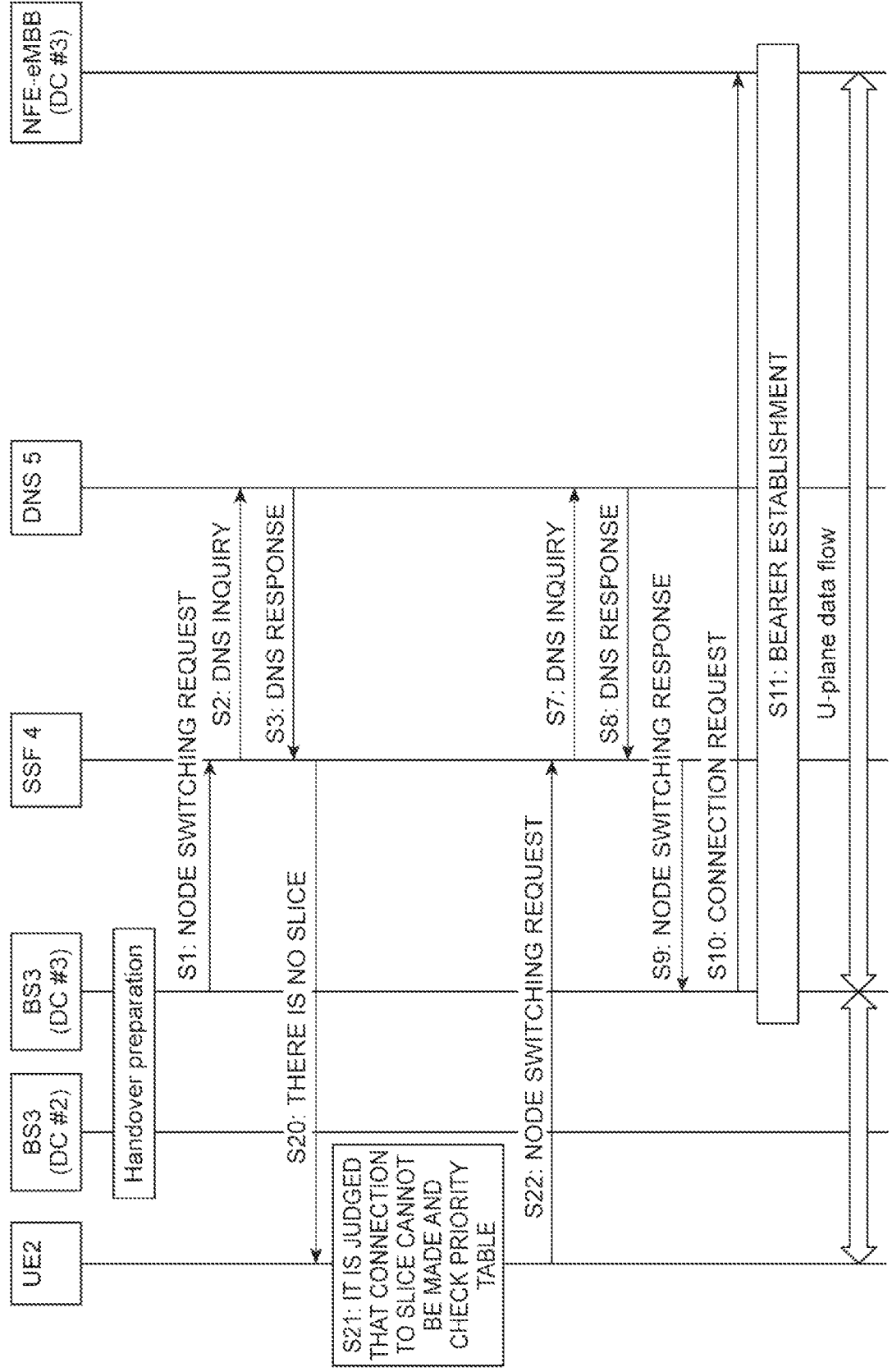
FIG. 14 is a flowchart (a priority list storing edition using a UE) illustrating a process executed in a slice management system (slice management method) according to an embodiment of the present invention.
Figure 15:
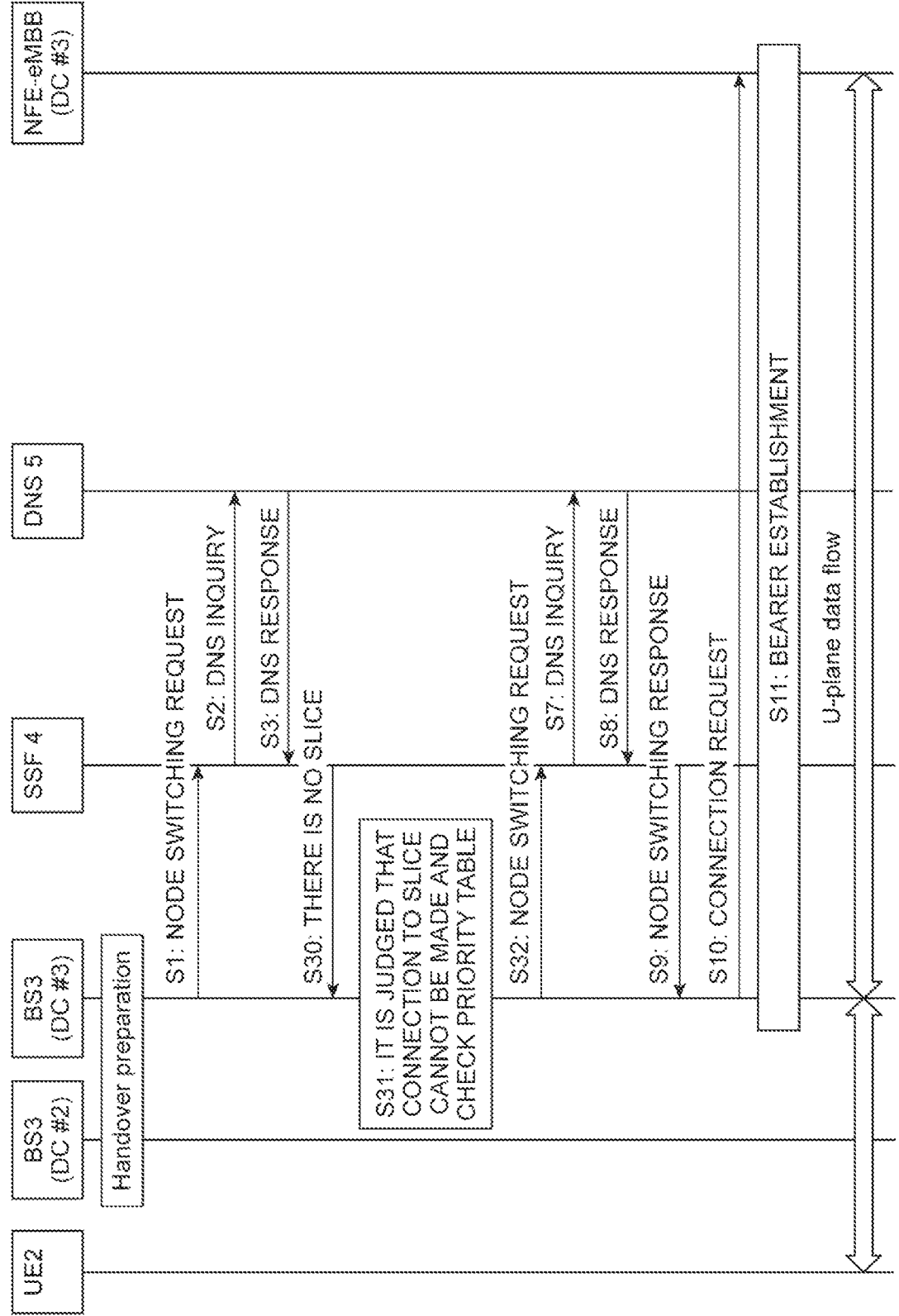
FIG. 15 is a flowchart (a priority list storing edition using a BS) illustrating a process executed in a slice management system (slice management method) according to an embodiment of the present invention.
Figure 16:
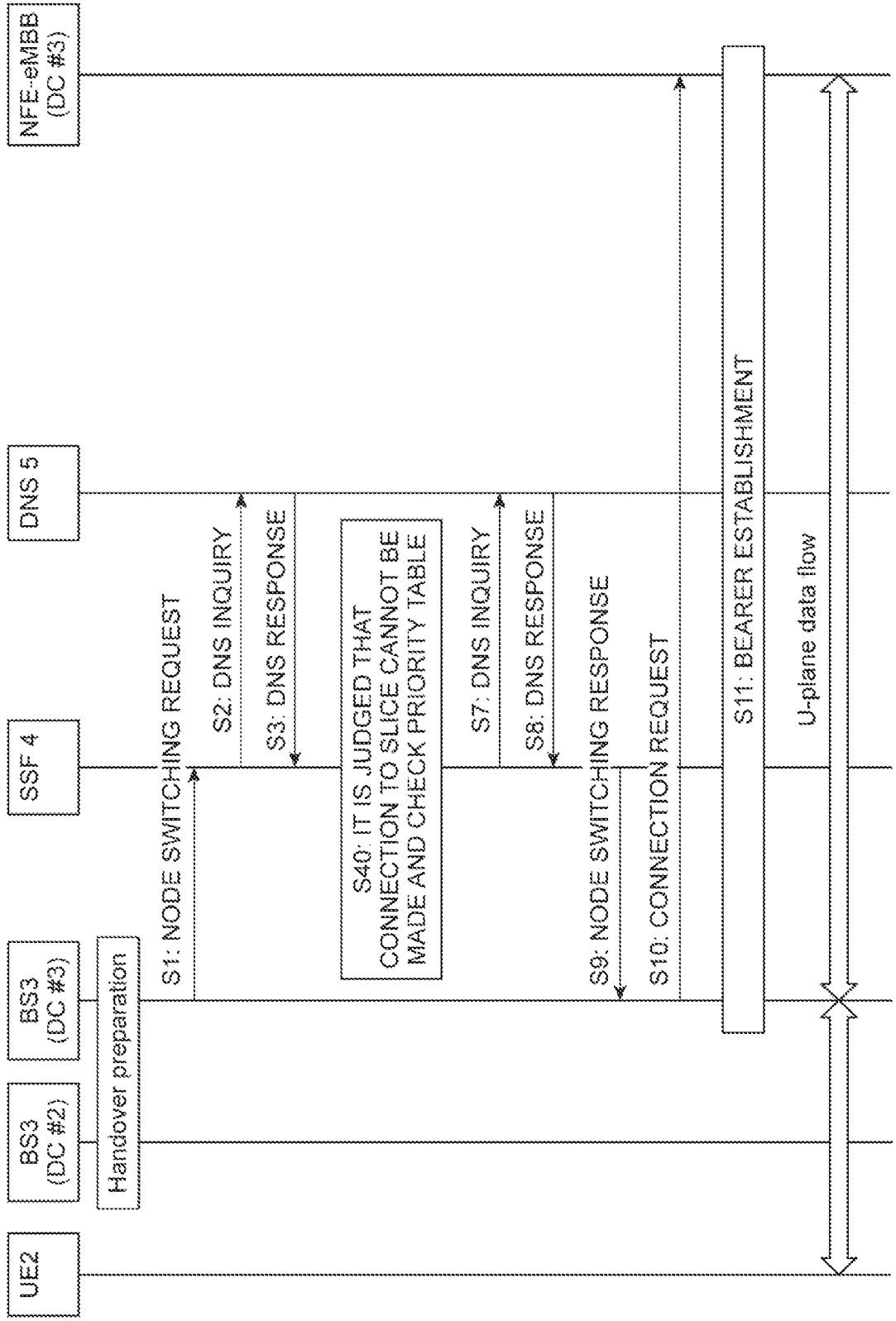
FIG. 16 is a flowchart (a priority list storing edition using a DNS) illustrating a process executed in a slice management system (slice management method) according to an embodiment of the present invention.

Next, a main process of a slice management method in the slice management system 1 will be described with reference to flowcharts illustrated in FIGS. 13 to 17. A main difference between the flowcharts is a node that stores a priority list. The flowchart illustrated in FIG. 13 is a flowchart of a case in which an independent repository stores a priority list. The flowchart illustrated in FIG. 14 is a flowchart of a case in which the UE 2 stores a priority list, the flowchart illustrated in FIG. 15 is a flowchart of a case in which the BS 3 stores a priority list, the flowchart illustrated in FIG. 16 is a flowchart of a case in which the SSF 4 stores a priority list, and the flowchart illustrated in FIG. 17 is a flowchart of a case in which the DNS 5 stores a priority list.

First, the flowchart illustrated in FIG. 13 will be described. When a UE 2 moves from DC #2 to DC #3, a handover preparation process is executed between the BS 3 of DC #2 and the BS 3 of DC #3, and a slice connection request (node switching request) (received from the UE 2) is transmitted to the SSF 4 by the BS 3 of DC #3 (Step S1). Next, a DNS inquiry is made for the DNS 5 by the slice connection judging unit 41 (Step S2) and a DNS response is acquired as a response thereof (Step S3). Next, it is judged by the slice connection judging unit 41 on the basis of the DNS response acquired in S3 whether a slice to which the UE 2 was connected in a moving source area can be connected in a moving destination area, and, here, it is assumed to be judged that connection to the slice cannot be made (Step S4). Next, an inquiry of a priority list is made for the independent repository by the slice connection judging unit 41 (Step S5), and a priority response is acquired as a response thereof (Step S6). Here, as the priority response, a response if assumed to be made using information relating to a plurality of slices that are connection candidates. In addition, as the priority response, a response may be made using information relating to one slice that is a connection candidate.

Next, a DNS inquiry is made by the slice switching unit 43 for the DNS 5 (Step S7), and a DNS response is acquired as a response thereto (Step S8). Here, it is assumed that a DNS inquiry is made for each of a plurality of slices that are connection candidates acquired in S6, and a corresponding IP address is acquired. Next, the slice switching unit 43 determines one slice to which the UE 2 is to be connected on the basis of the acquired DNS response. For example, the slice switching unit 43 determines a slice having a highest priority level among slices of which IP addresses are acquired from the DNS 5 as a slice to which the UE 2 is to be connected. Next, a node switching response including information relating to the determined slice is transmitted by the slice switching unit 43 to the BS 3 (Step S9). Next, a connection request is transmitted to a slice represented by the information relating to the slice included in the received node switching response using the BS 3 (Step S10), and a bearer is established (Step S11).

Hereinafter, in the flowcharts illustrated in FIGS. 14 to 17, differences from the flowchart of FIG. 13 will be described. The above description of corresponding step numbers may be referred to for step numbers that are common to those of the flowchart illustrated in FIG. 13 among step numbers included in the flowcharts illustrated in FIGS. 14 to 17.

The flowchart illustrated in FIG. 14 will be described. After S3, a DNS response (indicating that there is no slice to be connected) received in S3 is transmitted to the UE 2 using the SSF 4 (Step S20). Next, it is judged by the UE 2 that connection to the slice cannot be made (similar to S4), and subsequently, information relating to a slice that is a connection candidate is acquired by referring to the priority list stored in the UE 2 (similar to S5 and S6) (Step S21). Next, a node switching request including the information relating to the slice that is a connection candidate is transmitted to the SSF 4 using the UE 2 (Step S22). After S22, S7 is executed.

The flowchart illustrated in FIG. 15 will be described. After S3, the DNS response (indicating that there is no slice for a connection) received in S3 is transmitted to the BS 3 using the SSF 4 (Step S30). Next, it is judged that connection to the slice cannot be made using the BS 3 (similar to S4), and subsequently, the information relating to the slice that is a connection candidate is acquired by referring to the priority list stored in BS 3 (similar to S5 and S6) (Step S31). Next, a node switching request including the information relating to the slice that is a connection candidate is transmitted to the SSF 4 using the BS 3 (Step S32). After S32, S7 is executed.

The flowchart illustrated in FIG. 16 will be described. After S3, it is judged that connection to the slice cannot be made using the SSF 4 (similar to S4), and subsequently, the information relating to the slice that is a connection candidate is acquired by referring to the priority list stored in the SSF 4 (similar to S5 and S6) (Step S40). After S40, S7 is executed.

The flowchart illustrated in FIG. 17 will be described. After S2, it is judged that connection to the slice cannot be made on the basis of the DNS response received in S2 using the DNS 5 (Similar to S4), and subsequently, information relating to the slice that is a connection candidate is acquired by referring to the priority list stored in the DNS 5 (similar to S5 and S6) (Step S50). After S50, S8 is executed.

Next, operations and effects of the slice management system 1 configured as in this embodiment will be described.

According to the slice management system 1 of this embodiment, a slice to which the UE 2 is to be connected is determined on the basis of the priority list in which slices of connection destination candidates of the UE 2 are aligned in the order of the priority levels. For example, by determining a slice to which the UE 2 is to be connected from among two or more slices of the connection destination candidates, the slice to which the UE 2 can be connected can be determined more reliably. In other words, a slice to which the UE 2 is connected can be determined more flexibly. Accordingly, the UE 2 has a high possibility of receiving provision of a service without connection of the UE 2 to a slice being rejected.

In addition, according to the slice management system 1 of this embodiment, a slice to which the UE 2 is to be connected is determined on the basis of slices of the connection destination candidates associated with the user of the UE 2, and accordingly, for example, the UE 2 can be connected to a slice according to a request from each user of the UE 2. In this way, the UE 2 can be connected to a more appropriate slice.

In addition, according to the slice management system 1 of this embodiment, a slice to which the UE 2 is to be connected is determined on the basis of slices of the connection destination candidates associated with a service requested from the UE 2, and accordingly, for example, the UE 2 can be connected to a slice according to a service requested from the UE 2. In this way, the UE 2 can be connected to a more appropriate slice.

In addition, according to the slice management system 1 of this embodiment, a slice of a roaming destination is included in slices of the connection destination candidates included in the priority list, and the slice of the roaming destination can be determined as a connection candidate as well, whereby the number of options for slices of connection candidates of the UE 2 is increased. In this way, the UE 2 has a high possibility of receiving provision of a service without connection of the UE 2 to a slice being rejected.

In addition, according to the slice management system 1 of this embodiment, the priority list can be updated dynamically and flexibly on the basis of at least one of the operation statuses of managed slices, service required conditions of a service requested from the UE 2, service required conditions of managed slices, and contract information of users of the UE 2. Accordingly, the UE 2 can be connected to a more appropriate slice.

In addition, according to the slice management system 1 of this embodiment, in a case in which a connection request for a slice is acquired from the UE 2, it is judged whether or not the UE 2 can be connected in a moving destination area, which is a destination of the movement of the UE 2, to the slice connected in a moving source area. In a case in which it is judged that the connection cannot be made, one or more slices of the connection destination candidates are selected on the basis of order of the priority list, and a slice to which the UE 2 is to be connected is determined among selected slices on the basis of order of the priority levels. In this way, also in a case in which the UE 2 cannot be connected to the slice connected in the moving source area in the moving destination area, a slice to which the UE 2 is connected is determined more reliably, and accordingly, the UE 2 can be connected to the slice more reliably.

The information and the like described in this specification may be represented using any one of various other technologies. For example, data, instructions, commands, information, signals, bits, symbols, chips, and the like mentioned over the whole description presented above may be represented using a voltage, a current, an electromagnetic wave, a magnetic field or a magnetic particle, an optical field or a photon, or an arbitrary combination thereof.

Description of "on the basis of" used in this specification does not mean "only on the basis of" unless otherwise mentioned. In other words, description of "on the basis of" means both "only on the basis of" and "at least on the basis of."

"Unit" in the configuration of each device described above may be substituted with "means," "circuit," "device," or the like.

As long as "include," "including," and a variation thereof are used in this specification or the claims, such terms are intended to be understood as being inclusive like a term "comprise." In addition, a term "or" used in this specification or the claims is intended not to be exclusive OR.

The processing order, the sequence, the flowchart, and the like of each aspect/embodiment described in this specification may be changed in order as long as there is no contradiction. For example, in the method described in this specification, elements of various steps are presented in an exemplary order, and the order is not limited to the presented specific order.

Aspects/embodiments described in this specification may be used independently, be combined to be used, or be used to be switched over in accordance with the execution. In addition, a notification (for example, a notification of "being X") of predetermined information is not limited to be performed explicitly and may be performed implicitly (for example, a notification of predetermined information is not performed).

In this whole disclosure, a singular form is assumed to include a plural form unless it is clearly mentioned in the context. Thus, for example, in terms of "device," a case of a single device and a case of a plurality of such devices are included.

As above, while the present invention has been described in detail, it is apparent to a person skilled in the art that the present invention is not limited to the embodiments described in this specification. The present invention may be modified or changed without departing from the concept and the scope of the present invention set in accordance with the claims. Thus, the description presented in this specification is for the purpose of exemplary description and does not have any limited meaning for the present invention.

REFERENCE SIGNS LIST

1 Slice management system
2 UE
3 BS
4 SSF
5 DNS
6 SMF
7 MANO
40 Slice connection request acquiring unit
41 Slice connection judging unit
42 Priority list storing unit
43 Slice switching unit
60 Priority list updating unit
70 NFVO
71 VNFM
72 VIM

The invention claimed is:

1. A slice management system managing slices that are virtual networks generated on a network infrastructure, the slice management system comprising:
a memory storing a priority list in which slices of connection destination candidates of a terminal are aligned in order of priority levels,
wherein the slice management system:
judges whether or not a slice to which the terminal is connected in a moving source area can be connected in a moving destination area that is a destination of movement of the terminal in a case in which a connection request for a slice from the terminal is acquired; and
selects one or more slices of the connection destination candidates on the basis of the priority list stored in the memory and determines a slice to which the terminal is to be connected on the basis of the order of the priority levels among the selected slices in a case in which it is judged that the connection cannot be made.

2. The slice management system according to claim 1,
wherein the slices of the connection destination candidates comprised in the priority list are associated with each user of the terminal, and
wherein the slice management system determines a slice to which the terminal is to be connected on the basis of the slices of the connection destination candidates associated with the user of the terminal in the priority list.

3. The slice management system according to claim 1,
wherein the slices of the connection destination candidates comprised in the priority list are associated with each service requested from the terminal, and
wherein the slice management system determines a slice to which the terminal is to be connected on the basis of the slices of the connection destination candidates associated with the service requested from the terminal in the priority list.

4. The slice management system according to claim 2,
wherein the slices of the connection destination candidates comprised in the priority list are associated with each service requested from the terminal, and
wherein the slice management system determines a slice to which the terminal is to be connected on the basis of the slices of the connection destination candidates associated with the service requested from the terminal in the priority list.

5. The slice management system according to claim 1, wherein the slices of the connection destination candidates comprised in the priority list comprise a slice of a roaming destination.

6. The slice management system according to claim 1, wherein the priority list is updated on the basis of at least one of operation statuses of managed slices, service required conditions of a service requested from the terminal, service required conditions of managed slices, and contract information of a user of the terminal.

7. A slice management method executed by a slice management system managing slices that are virtual networks generated on a network infrastructure, the slice management method comprising:
a judgement step of judging whether or not a slice to which a terminal is connected in a moving source area can be connected in a moving destination area that is a destination of movement of the terminal in a case in which a connection request for a slice from the terminal is acquired; and
a determination step of selecting one or more slices of the connection destination candidates on the basis of a priority list, in which slices of connection destination candidates of the terminal are aligned in order of priority levels, stored in a memory and determining a slice to which the terminal is to be connected on the basis of the order of the priority levels among the selected slices in a case in which it is judged that the connection cannot be made in the judgement step.

8. The slice management method according to claim 7,
wherein the slices of the connection destination candidates comprised in the priority list are associated with each service requested from the terminal, and
wherein, in the determination step, a slice to which the terminal is to be connected is determined on the basis of the slices of the connection destination candidates associated with the service requested from the terminal in the priority list.

\* \* \* \* \*